United States Patent [19]

Mueller et al.

[11] 4,001,584
[45] Jan. 4, 1977

[54] AUTOMATIC SAMPLE CHANGER

[75] Inventors: Anthony A. Mueller, Florence;
Frank W. Bao, Crestview Hills;
Stephen D. Parker, Erlanger;
James L. Hummeldorf,
Morningview, all of Ky.

[73] Assignee: Actus, Inc., Florence, Ky.

[22] Filed: Oct. 29, 1975

[21] Appl. No.: 626,923

Related U.S. Application Data

[63] Continuation of Ser. No. 504,743, Sept. 10, 1974, abandoned.

[52] U.S. Cl. .............................................. 250/328
[51] Int. Cl.² .......................................... G01T 1/00
[58] Field of Search .................................... 250/328

[56] References Cited
UNITED STATES PATENTS

3,187,182   6/1965   Fratantuno ........................ 250/328

*Primary Examiner*—Harold A. Dixon
*Attorney, Agent, or Firm*—Fleit & Jacobson

[57] ABSTRACT

An automatic sample changer particularly suited for use in counting biomedical samples from in vitro tests using radiopharmaceuticals such as the technique of radioimmunoassay. A plurality of samples, such as gamma ray emitting samples housed in test tubes, are automatically circulated around a continuous track and are sequentially associated with a radiation counting device by way of an elevator mechanism. A single rotating driving wheel is effective in moving one hundred samples independently travelling on the continuous track. Also disclosed is a breakaway safety mechanism associated with the elevator, and means for detecting and signaling jams in the track and elevator.

35 Claims, 10 Drawing Figures

AUTOMATIC SAMPLE CHANGER

This is a continuation application of U.S. Ser. No. 504,743, filed Sept. 10, 1974, now abandoned.

BACKGROUND OF THE INVENTION

Radioimmunoassay is generally defined as those techniques which employ the principle of isotopic dilution in the presence of specific antibodies. This principle finds many uses in the laboratory, for example, in detecting the presence of the hepatitis associated antigen (HAA) in serum. In this regard, the "sandwich principle" is gaining in popularity.

The sandwich principle in HAA detection denotes the sandwiching of antigens between antibodies. More specifically, when a serum containing HAA is added to a test tube whose walls have previously been coated with antibodies, the HAA binds to the antibodies on the walls of the tube. Then, after rinsing, radioactive antibodies added to the tube link with the previously bound antigen, creating the "sandwich." Radioimmunoassay relates to the technique for detecting and determining the level of radioactivity remaining in the so-treated test tube. Without the presence of HAA, the radioactive antibodies will be rinsed from the tube, and hence relatively no radiation will be detected. However, if HAA was present, the radioactive antibodies will remain linked in the sandwich on the walls of the test tube, and a relatively high level of radiation will be detected.

In the past, samples of the type described above have been tested for radioactivity in several ways. One procedure which is still popular is the manual procedure, in which the test tubes containing the samples are tested one by one. The tubes are sequentially manually inserted into a radiation detector, the level of radiation is read and recorded, and the tubes are removed. With this procedure, it is of course necessary that a technician always be present.

Modern technology has, to some extent, improved the manual technique noted above. There are automatic sample changers on the market today which accept a plurality of samples for testing, and which automaticaly transport and test the samples, and record the level of radiation so detected. However, each of these known automatic sample changers suffers from one or more of several drawbacks. Many are quite large, complex, and accordingly expensive. Others are limited to accepting only a small number of samples. And still others, capable of receiving many samples, cannot accept the standard size test tube. Furthermore, many of the known automatic sample changers can be dangerous if misused by the attendant technician.

It is the purpose of the present invention to provide an automatic sample changer which eliminates the drawbacks of the prior art which have been noted above.

SUMMARY OF THE INVENTION

The present invention relates to an automatic sample changer for transporting and analyzing a plurality of biomedical samples from in vitro tests using radiopharmaceuticals. The samples are preferably housed in test tubes and associated with respective independent rings, or pucks, adapted to slide in a continuous track. The track is shaped in such a manner that a large number of pucks, one hundred in a specific example, can be indexed along the track by a single rotating indexing wheel. Furthermore, when the indexing wheel is in its static condition, the pucks are maintained in a relatively fixed position along the track.

At the center-line of the continuous track, an elevator sequentially receives the pucks and their associated samples, and lowers the same into a mechanism for detecting the level of radioactivity of the sample. After the radiation count is completed, the elevator returns the pucks and samples to the track for subsequent indexing.

Also provided is a breakaway linkage assembly which controls the operation of the elevator. Should an obstruction, such as a finger, block the free travel of the elevator, the driving mechanism breaks away from the elevator, without harm to the obstruction.

The inventive automatic sample changer is additionally equipped with mechanical and electrical components through which jams in the track or in the elevator are detected and indicated. When the track jams, the jam is so indicated after the elapse of a pre-determined period of time after the initiation of the indexing cycle. Similarly, when the elevator breakaway function is operated, a jam is visually and audibly indicated.

As noted above, many of the prior art automatic sample changers are quite large, have limited sample capacity, or are not compatible with standard size test tubes. The inventive sample changer, on the other hand, is a relatively small unit of the table-top variety. Yet, the changer can accept one hundred samples or more, housed in test tubes of standard size.

It is accordingly an object of the present invention to provide an automatic sample changer which eliminates those disadvantages of the prior art noted above.

A more specific object of the present invention is to provide a table-top automatic sample changer in which a large number of samples can be transported and tested.

Another object of the present invention is to provide an automatic sample changer having a continuous track for effectively transporting a large number of samples in a simplified fashion.

Still a further object of the present invention is to provide an automatic sample changer in which a plurality of samples arranged along a continuous track are fixed in position while the sample changer is in its static condition.

Still another object of the present invention is to provide an automatic sample changer having a breakaway elevator drive mechanism which ensures the safety of operating personnel.

A further object of the present invention is to provide an automatic sample changer in which jams in the track and elevator are detected and indicated.

These and other objects of the present invention, as well as many of the attendant advantages thereof, will become more readily apparent when reference is made to the following description taken in conjunction with the accompanying drawings.

DETAILED DESCRIPTION OF THE DRAWINGS

Figures 1, 2:
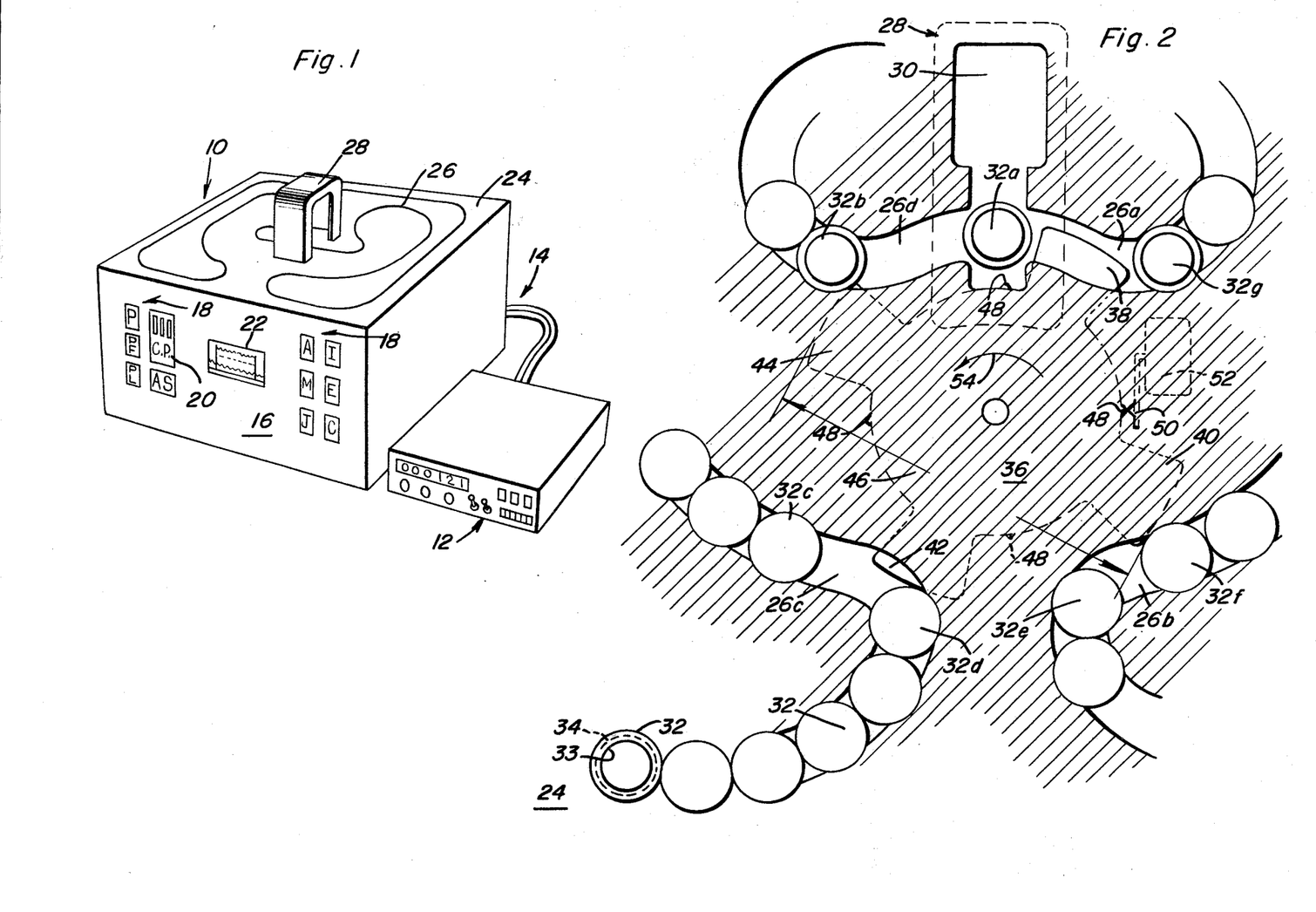
FIG. 1 is a perspective view of the inventive sample changer, associated with a display and computation device.
FIG. 2 is a top view of the track of the inventive sample changer, illustrating the operation of the driving mechanism.

With reference first to FIG. 1, the inventive automatic sample changer can be seen generally at 10. The sample changer is connected to a display and computation unit 12 by way of three linking cables shown generally at 14. The front panel 16 of the sample changer 10 is equipped with several control and indicator buttons 18, the functions of which will be described below, a conveyor position indicator 20, and a paper tape printout 22. The cover plate 24 of the sample changer 10 defines a continuous track 26, symmetrical about its illustrated center line which will also be described in greater detail below, and houses an elevator mechanism protected by a cover 28.

Figure 5:
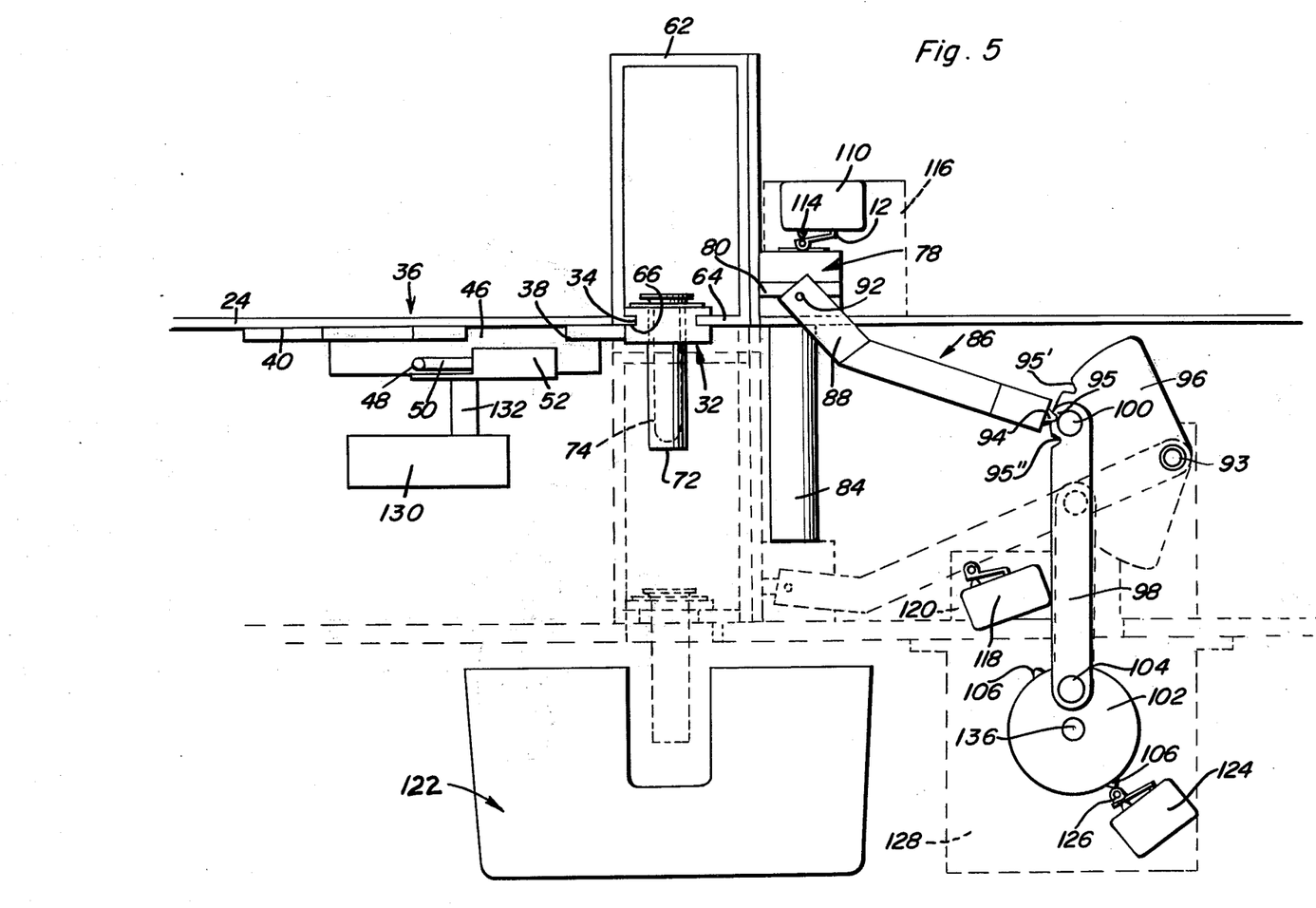
FIG. 5 is a side view of the inventive elevator mechanism.

The indexing, or conveyor or mechanism, is best illustrated in FIG. 2. The cover plate 24 of the sample changer 10 takes the form of a solid plate out of which is carved the continuous track 26 and an opening 30 adapted to accept the elevator mechanism. A plurality of pucks 32, one hundred being shown, is arranged along the length of track 26. As best seen in FIGS. 2 and 5, each puck 32 is cyclindrical, and has a groove 34 recessed into the surface thereof. The groove 34 is recessed into the body of puck 32 an extent so that the puck may freely slide in the track 26. A bore 33 is carved out of each puck 32 to house a liner and a test tube containing the sample.

An indexing wheel 36 is mounted beneath the cover 24 for rotation about an axis passing through the center line of the track 26. The indexing wheel 36 comprises four fingers 38, 40, 42 and 44 extending radially from a central hub 46. The indexing wheel 36 is also provided with four camming projections 48 equally spaced about the periphery of the hub 46. For reasons which will be explained in greater detail below, the projections 48 serve to cam the arm 50 of a microswitch 52 fixed beneath the cover plate 24.

FIG. 2 illustrates the positions of the respective pucks when the automatic sample changer 10 is in its measurement mode. In this regard, the sample ready for testing is that associated with puck 32a. In the illustrated position of the indexing wheel 36 and the respective pucks 32, all pucks are blocked from moving along the track 26. This is accomplished by the respective fingers of the indexing wheel extending into the region of the track. Finger 38 extends into the track 26 as shown at 26a; a portion of finger 40 extends into the region of the track designated 26b; finger 42 extends into the track at region 26c; and finger 44 enters the track at region 26d to serve as a stop for attempted puck movement. Therefore, the pucks 32b through 32c are held between fingers 42 and 44, pucks 32d through 32e are held between fingers 40 and 42 and pucks 32f through 32g are held in position between fingers 38 and 40. Pucks 32a is held in the elevator mechanism, with finger 38 being spaced approximately ⅛ inch from the puck when held in the elevator mechanism. With the configuration described above, it is virtually impossible for the pucks to be inadvertently moved into positions which would jam the track.

Figure 3:
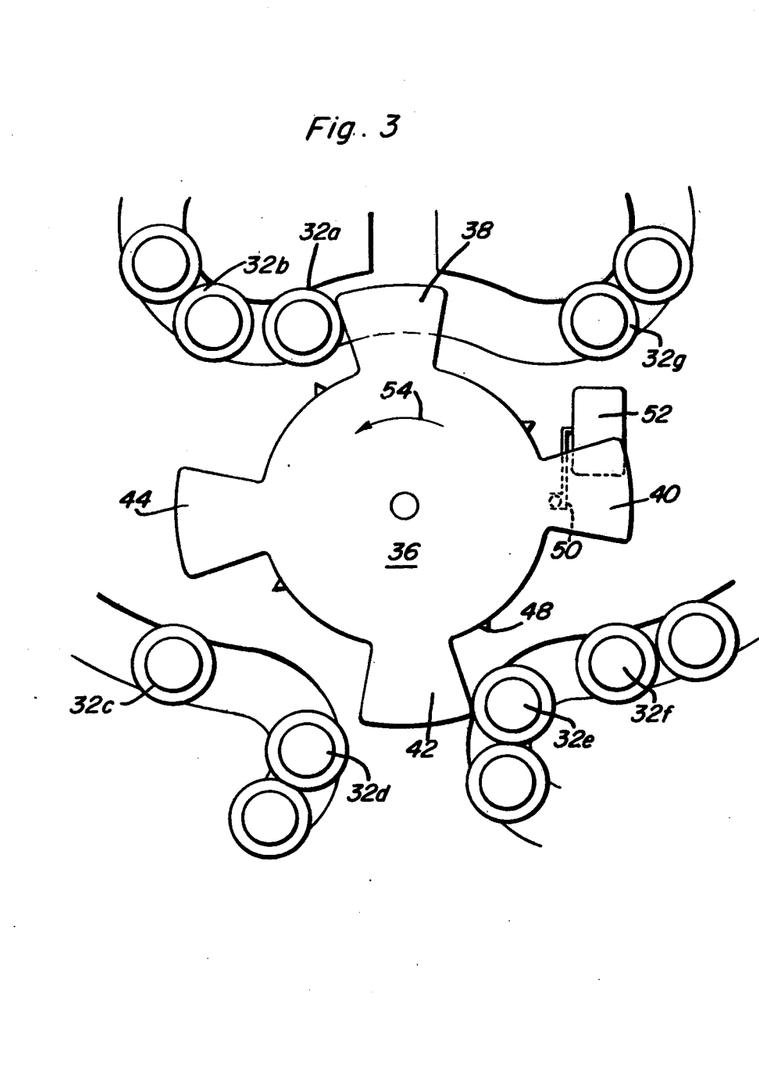
FIG. 3 is a partial top view of the track shown in FIG. 2, but with the indexing wheel in an advanced position.
Figure 4:
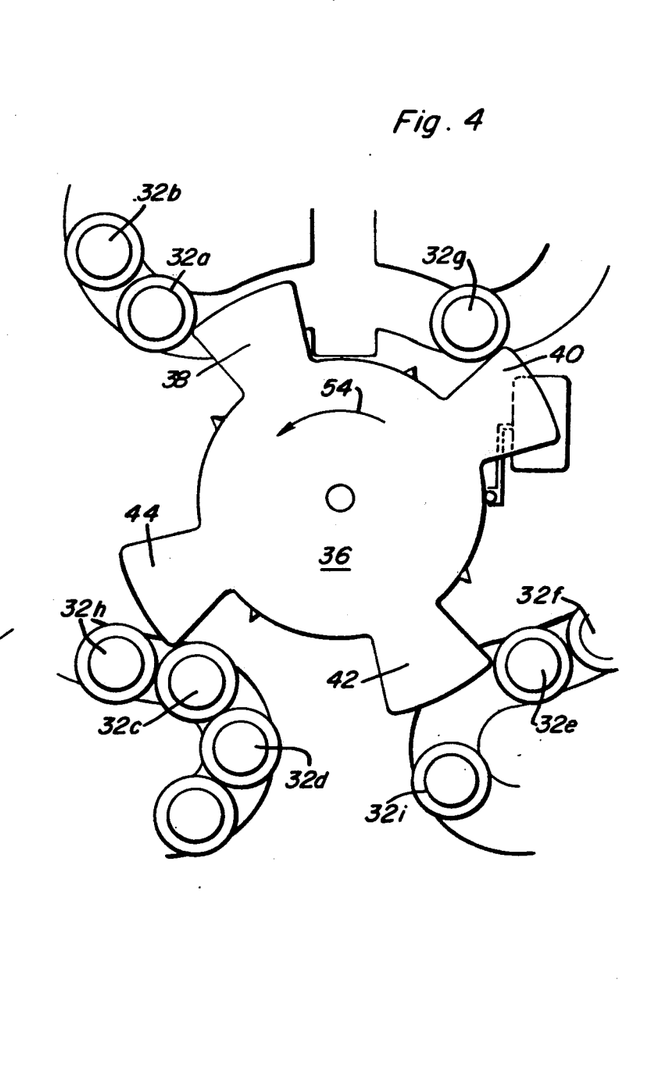
FIG. 4 is a view similar to FIG. 3 but showing the indexing wheel in still a more advanced position.

Still referring to FIG. 2, and with reference now to FIGS. 3 and 4, the sequential operation of the indexing wheel 36 and the respective pucks 32 will be described. The indexing wheel 36 is illustrated for movement in the direction of arrow 54. As can be seen, when wheel 36 moves from the FIG. 2 to the FIG. 3 position, puck 32a has been moved by finger 38 out of the region of the elevator without imparting motion to any of the other pucks. However, when the indexing wheel 36 continues its rotation in the direction of arrow 54 and takes the position illustrated in FIG. 4, all of the one hundred pucks in track 26 are moved. Finger 38 moves pucks 32a through 32h. Finger 44, in turn, moves pucks 32c through 32i. Similarly, finger 42 moves pucks 32e through 32g. In the position illustrated in FIG. 4, finger 40 has captured puck 32g, and continued rotation of the indexing wheel 36 will drive this puck into the region of the elevator. At this time, the pucks in the track will have completed an indexing operation.

However, if during the sequential operation of the index wheel 36 and before completion of the indexing cycle a mechanical jam of the pucks 32 causing stoppage of index wheel 36 should occur, the index motor 130 will be stalled. As will be explained in greater details in FIG. 10, the dam alarm will be actuated by a time delay circuit causing index motor 130 to be idled.

Figure 6:
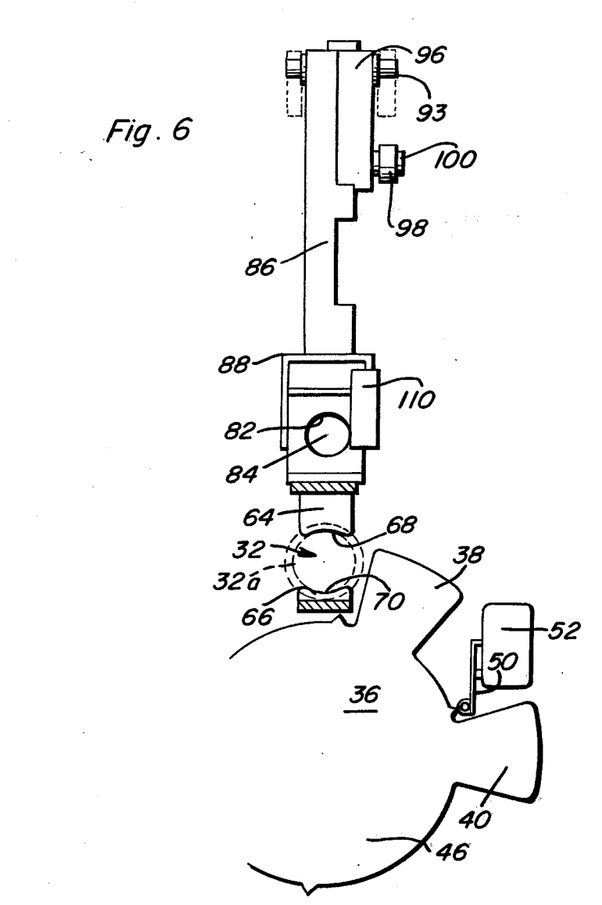
FIG. 6 is a top view of the elevator mechanism illustrated in FIG. 5.
Figure 7:
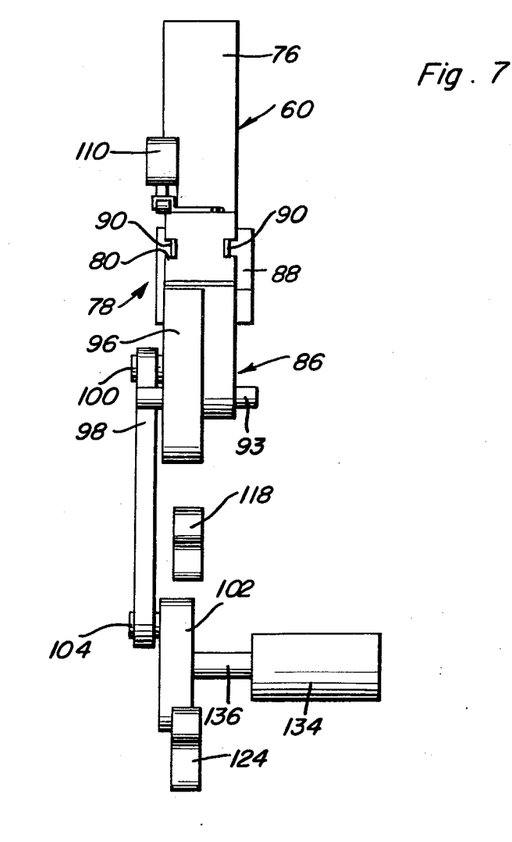
FIG. 7 is a rear view of the elevator mechanism illustrated in FIG. 5.

With reference now to FIGS. 5 through 7, the inventive elevator mechanism, shown generally at 60, will be described. The elevator mechanism 60 is equipped with a cage 62 of a resilient material, which is closed at the top and which has inwardly projecting arms 64 and 66 at the bottom thereof. Arms 64 and 66 are convex at 68 and 70, to grasp the respective pucks 32 in their grooves 34. The cage 62 is resilient so as to enable expansion into the position shown in phantom in FIG. 5 during the introduction and removal of pucks. The concave surfaces 68 and 70, in combination with the resilient nature of the cage 62, ensures that the puck is advanced into and is snugly held in the cage 62. A liner 72 and a test tube 74 containing the sample under investigation, are adapted to rest on the flange around the bore 33.

The cage 62 is mounted on a bracket 76 which is, in turn, fixed to a block 78 having linear grooves 80 in opposite walls thereof. The block 78 is bored out at 82 and slides along a shaft 84. In this regard, FIG. 5 illustrates the two extreme positions of the block 78, the upper position being illustrated in solid lines, and the lower position being shown in phantom.

An arm 86 having a forked end 88 associates with the grooves 80 in the block 78 through a pair of rollers, or buttons 90 the reduced diameter ends 92 of which are fixed in the forked region 88 of the arm 86. Buttons 90 are dimensioned so as to freely pivot and slide in the grooves 80. The arm 86 is pivotally mounted about a shaft 93 fixed relative to the casing of the sample changer 10. A plunger 94 is mounted in a recess defined in the arm 86, and is biased by a spring (not shown) toward the surface of a pawl 96 for reasons which will be explained below. Three detents 95, 95' and 95" are recessed into the surface of pawl 99, and are adapted to associate with the plunger 94. As illustated in FIG. 5, the central dentent 95 has captured plunger 94. A rocker arm 98 is connected to the pawl 96 through a shaft 100 and is, in turn, connected to a cam wheel 102 through a shaft 104. The cam wheel 102 has two camming surfaces 106 and 108, respectively, on opposed sides thereof.

An upper-limit microswitch 110 having a control arm 112 for associating with a plunger 114, is mounted on a bracket 116 fixed relative to the casing of the sample changer 10. Plunger 114 of the microswitch 110 is depressed when the block 78, with its connected elevator mechanism 60 takes their uppermost position. A lower-limit microswitch 118 mounted on a bracket 120 communicates with the arm 86 when the arm and its associated elevator mechanism 60 takes their lowermost position. The lowermost position of the elevator mechanism 60 is illustrated in phantom in FIG. 5, where it can be seen that the arm 86 is in communication with the microswitch 118. It can also be seen that when in the lowest position, the test tube 74 containing the sample under study resides in a detector mechanism which is shown generally at 122.

A syncronization microswitch 124 having a control arm is mounted on a bracket 128 fixed relative to the casing of the sample changer 10, and is actuated by the cam surfaces 106 and 108 on the cam wheel 102. An index motor 130 acts through a shaft 132 and controls the rotation of the index wheel 36. The elevator mechanism is controlled by way of a motor 134 acting through a shaft 136 and the cam wheel 102 which, in turn, effects movement of the rocker arm 98 and arm 86 through pawl 96.

With continuing reference to FIGS. 5 through 7, the operation of the elevator mechanism 60 will be described. In the position illustrated in solid lines in FIG. 5, the elevator cage 62 is its uppermost position. In this position, the plunger 114 of the microswitch 110 is depressed through the action of arm 112, due to contact from the block 78. At the same time, the plunger of microswitch 124 is depressed by the interaction between cam surface 108 and control arm 126. With the elevator mechanism in its lowermost position, on the other hand, the plungers of the respective microswitches 118 and 124 are simultaneously depressed. Microswitch 118 is actuated by contact from the rocker arm 86, and microswitch 124 is actuated by the interaction between the cam surface 108 and the control arm 126. As will be explained in greater detail below, simultaneous actuation of microswitches 110 and 124, or microswitches 118 and 124, is indicative of normal operation of the elevator mechanism 60.

Should a jam occur during the travel of the elevator cage 62 from its uppermost position illustrated in solid lines to its lowermost position illustrated in phantom, the following action takes place. With the cage 62 jammed, the elevator motor 134 continues to turn the cam wheel 102 through the associated shaft 136, and hence the connected rocker arm 98 moves downwardly. Accordingly, the pawl 96 rotates in a counterclockwise direction about its shaft 92.

As will be recalled, the plunger 94 normally resides in detent 95 in the contacting surface of pawl 96. Accordingly, during normal operation, the arm 86 moves with the pawl 96 as a result of the biased contact between the plunger 94 and the detent 95. With movement of the elevator cage blocked on the other hand, plunger 94 is freed from detent 95, thereby enabling relative movement between the pawl 96 and arm 86. The plunger 94 rides up the surface of pawl 96, past detent 95'. The elevator arm 86 was prevented by the jam from reaching and actuating microswitch 118 therefore the elevator motor 134 is not idled and continues to drive the cam wheel 102 and hence the connected rocker arm 98 moves upward, rotating the pawl 96 in a clockwise direction about its shaft 92 until the plunger 94 is captured by detent 95'. Should the jam be only effective in inhibiting the travel of the elevator cage 62 in the downward direction, but not inhibitive in the upward direction, the elevator cage 62 will be driven upward by arm 86 until block 78 contacts arm 112 actuating microswitch 110 idling the elevator motor 134. Since the plunger 94 resided in detent 95' rather than detent 95 which is normal, microswitch 124 is not actuated by either cam surface 106 or 108 simultaneously with actuation of microswitch 110. As will become clear from the following, such independent actuation of microswitch 110 and microswitch 124 sounds a jam alarm.

With the sounding of the jam alarm, operation of the elevator mechanism is interrupted. When the jam reset button on the front panel 16 is depressed and the cause of the jam is corrected, the remaining portion of the elevator cycle may be initiated. That is, the front panel elevator switch is manually depressed and the elevator motor 134 rotates its shaft 136 and hence the cam wheel 102. The rocker arm 98 accordingly moves the pawl 96 in a clockwise direction about the shaft 92 until the plunger 94 sets itself in detent 95. The pawl 96 continues to rotate counterclockwise until microswitch 118 is simultaneously actuated with microswitch 124. At this occurrence the breakaway mechanism is reset and normal operation may be resumed.

The above description has referenced a jam during the downward movement of the elevator mechanism 60. It should be understood, however, that a similar operation occurs if a jam should occur during the upward movement of the elevator mechanism. Under these circumstances, the plunger 94 would travel downwardly past detent 95" while the pawl 96 rotates in a clockwise direction. Therefore, the microswitch 118 would be actuated without simultaneous actuation of microswitch 124. The jam alarm would thus be sounded, and the jam could be removed in a manner similar to that described above.

Should a jam occur which limits the cage 62 motion to the extent that the block 78 and arm 112 are prevented from actuating microswitches 110 and 118 respectively, the elevator motor 134 will continue to run. As will be explained in greater detail, in FIG. 10, the jam alarm will be actuated by a time delay circuit, and elevator motor 134 will be idled.

It should also be recalled that the cam surfaces 48 of the index wheel 36 associated with the arm 50 of a microswitch 52. The function of microswitch 52 is to reset a timing circuit each time the microswitch is actuated. Should a jam occur in the track, the index wheel 36 would be blocked from rotation, and hence periodic actuation of the microswitch 52 would be prevented. Actuation of the index motor 130 for a predetermined period of time without actuation of the microswitch 52 initiates the jam alarm.

Figure 8:
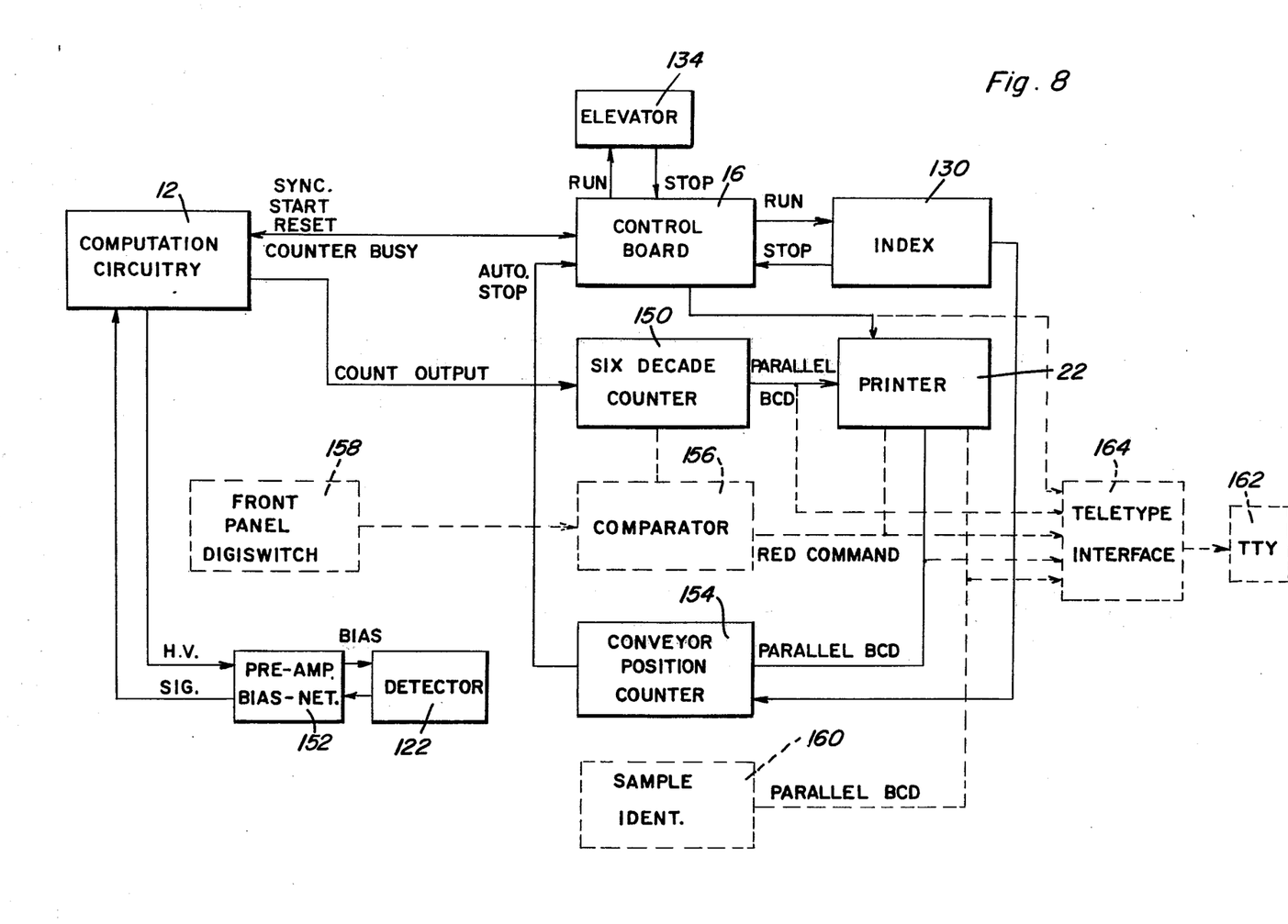
FIG. 8 is a simplified block diagram of the inventive automatic sample changer.

With reference now to FIG. 8, the overall operation of the inventive automatic sample changer will be described. The computation circuitry is designated 12, as in FIG. 1. It is this unit which receives and operates on the quantity of gamma radiation from the sample to the detector 122. The detector 122 receives biasing signals from a preamplification and biasing network 152 which in turn receives high voltage energy from the computation circuitry 12. When the unit 12 is counting, a "counter busy" signal is sent to the control board designated 16, and the index motor 130 and elevator motor 134 are idle. The count from the computation circuitry 12 is fed to a six-decade counter 150 which converts the count output to parallel binary coded decimal (BCD) format. The count from the detector is fed to the preamplication circuit 152 and then to the computation circuitry 12 for further processing. Upon the completion of a count, after the elapse of a predetermined interval of time, the printer 122 prints the count designated by the six-decade counter 150. At the same time, the printer 22 prints the conveyor position embodied in a BCD signal issued by the conveyor position counter 154.

At the end of a measurement cycle, the elevator motor 134 receives a command signal from the control board 16 and returns the sample to the track 26. When the sample is returned to the track, the control board commands the index motor 130 to index the samples in the track by one position. Upon the completion of indexing, the conveyor position counter 154 revises its BCD output for the printer 22. Upon the control board 16 receiving signals from the conveyor position counter 154 indicative of a complete indexing cycle, that is one hundred units for the specific embodiment illustrated, the sample changer is made idle.

The block diagram of FIG. 8 illustrates three possible optional functions. The first relates to the comparator 156 and front panel digiswitch 158. With this option, a predetermined maximum allowable count can be set on the front panel digiswitch 158. The switch setting is fed to the comparator 156, along with a signal from the counter 150 indicative of the actual count output of the computation circuitry 12. If the reading from the counter 150 is less than that fed into the comparator 156 by digiswitch 158, then the test is negative. However, if the counter 150 issues a count higher than the maximim allowable count issued by the digiswitch 158, then the comparator 156 so indicates and a red command is issued to the printer 22. When the operator then reviews the tape from the printer 22, dangerous readings are quickly recognized.

The second optional function is represented by the sample identification network 160. With the inventive automatic sample changer, it is possible to conduct several types of gamma count tests. For example, in addition to the test for hepatitis, the inventive sample counter can test for the presence of thyroid abnormalties. It is contemplated that the liner 72 illustrated in FIG. 5 be coded, for example optically, to designate the type of test to be conducted. Under these circumstances, the sample identification 160 would be an optical reader which issues a BCD signal indicative of the reading taken from the liner 72. The reading could be fed to the printer 22, so that the printed tape would designate the type of sample under study.

The third optional feature illustrated in FIG. 8 involves the addition of a teletype mechanism 162 and an interface 164. With this option, the results from the gamma counter could be fed directly to a computer.

Figure 9:
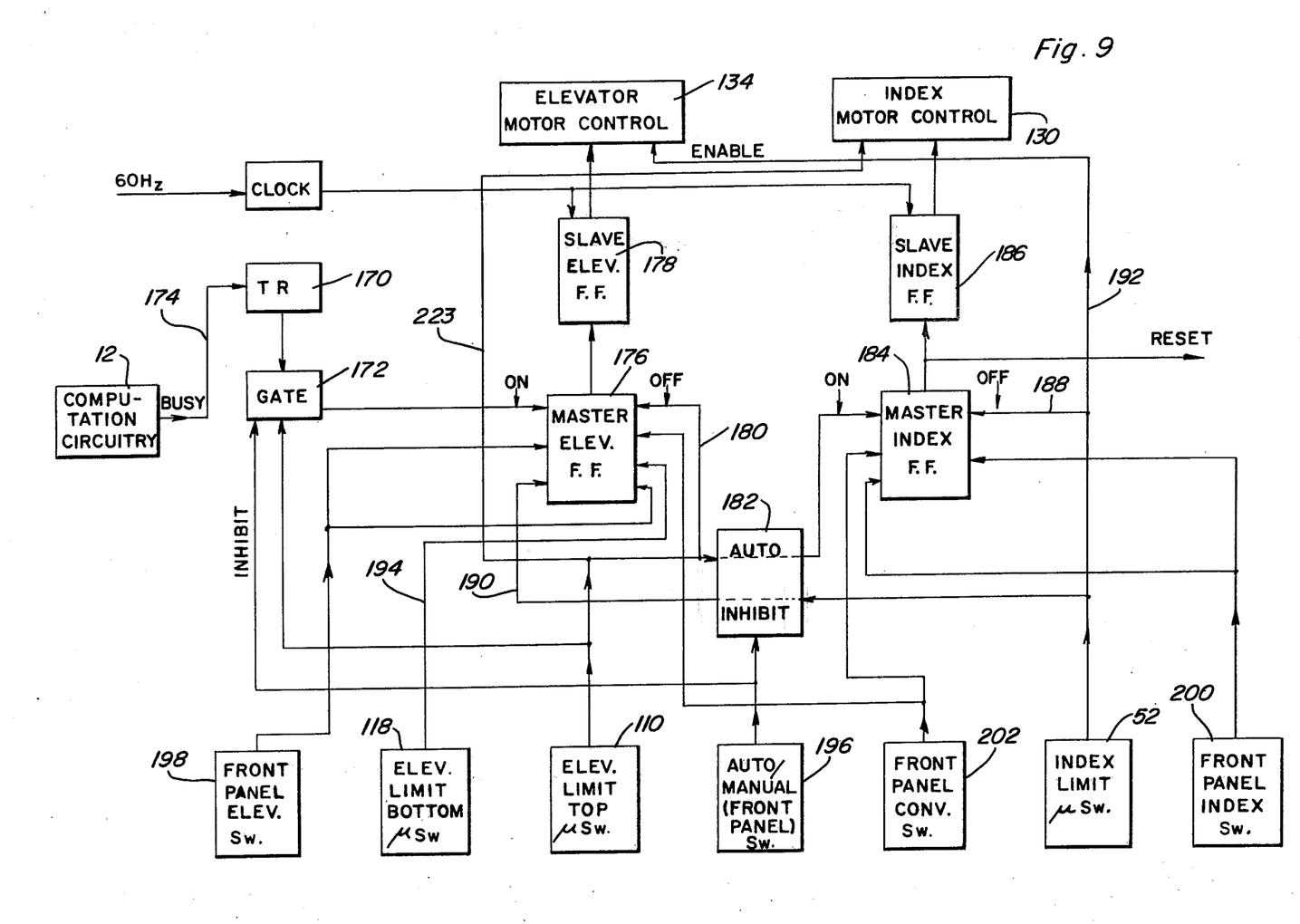
FIG. 9 is a block diagram illustrating the motor control employed in the inventive automatic sample changer.

Now, reference is directed to FIG. 9, a block diagram of the control board, motor controls, and interlock circuitry. Beginning at the computation circuitry 12, when a "busy signal" is issued, transistor 170 blocks a signal from reaching gate 172. When a counting operation is completed by computation circuitry 12, on the other hand, a high is generated on line 174, travelling through transistor 170 and gate 172, and starting elevator motor 134 through master and slave flip-flop circuits 176 and 178, respectively. The elevator runs until the top-limit microswitch 110 is encountered by the block 78 illustrated in FIG. 5, at which time switch 110 enables the index motor 130 through line 223. The same signal from the switch 110 is directed through inhibit circuit 182, and starts the index motor 130 through the means of master and slave index circuits 184 and 186.

Indexing continues until one of the cam surfaces 48 on the index wheel 36 actuates microswitch 52, as in the position illustrated in FIG. 6. At this time, microswitch 52 idles the index motor 130 through line 188. The same signal passes through line 190 to start the elevator motor 134.

It should be noted that the signal issued by the index limit switch 52 also tavels along line 192 and serves as an enabling signal to the elevator motor control 134. In the absence of this enabling signal, the elevator motor 134 will not operate. It is therefore ensured that the index wheel 36 is in a proper position of index before the elevator can be operated. The elevator then continues to operate until bottom-limit microswitch 118 is actuated by arm 86 as illustrated in FIG. 5. At this time, the bottom-limit microswitch 118 issues a signal on line 194 which idles elevator motor 134. While not illustrated, switch 118 also initiates the activity of the computation circuitry 12.

The foregoing description of FIG. 9 has been based upon the auto/manual front panel switch 196 being in the automatic position. When in the manual mode, the closed circuit through the inhibit circuit 182 indicated by dotted lines is opened to disenable automatic commands to the master elevator flip-flop 176 and the master index flip-flop 184. Gate 172 is also disenabled so that the elevator is neither elevated nor lowered after a count is completed by 12.

The front panel elevator switch 198 is connected directly to the "on" and the "off" terminals of the master elevator flip-flop 176, and hence can directly control the elevator motor 134. Similarly, the front panel index switch 200 is in direct control of the index motor 130 through master index flip-flop 184. Also provided is a front panel conveyor switch 202 which is in direct control of the index motor 130 through master index flip-flop 184, and which also inhibits the elevator motor 134 through master elevator flip-flop 176. The front panel conveyor switch 202 is used to advance several samples past the sampling position without actuating the elevator mechanism.

Figure 10:
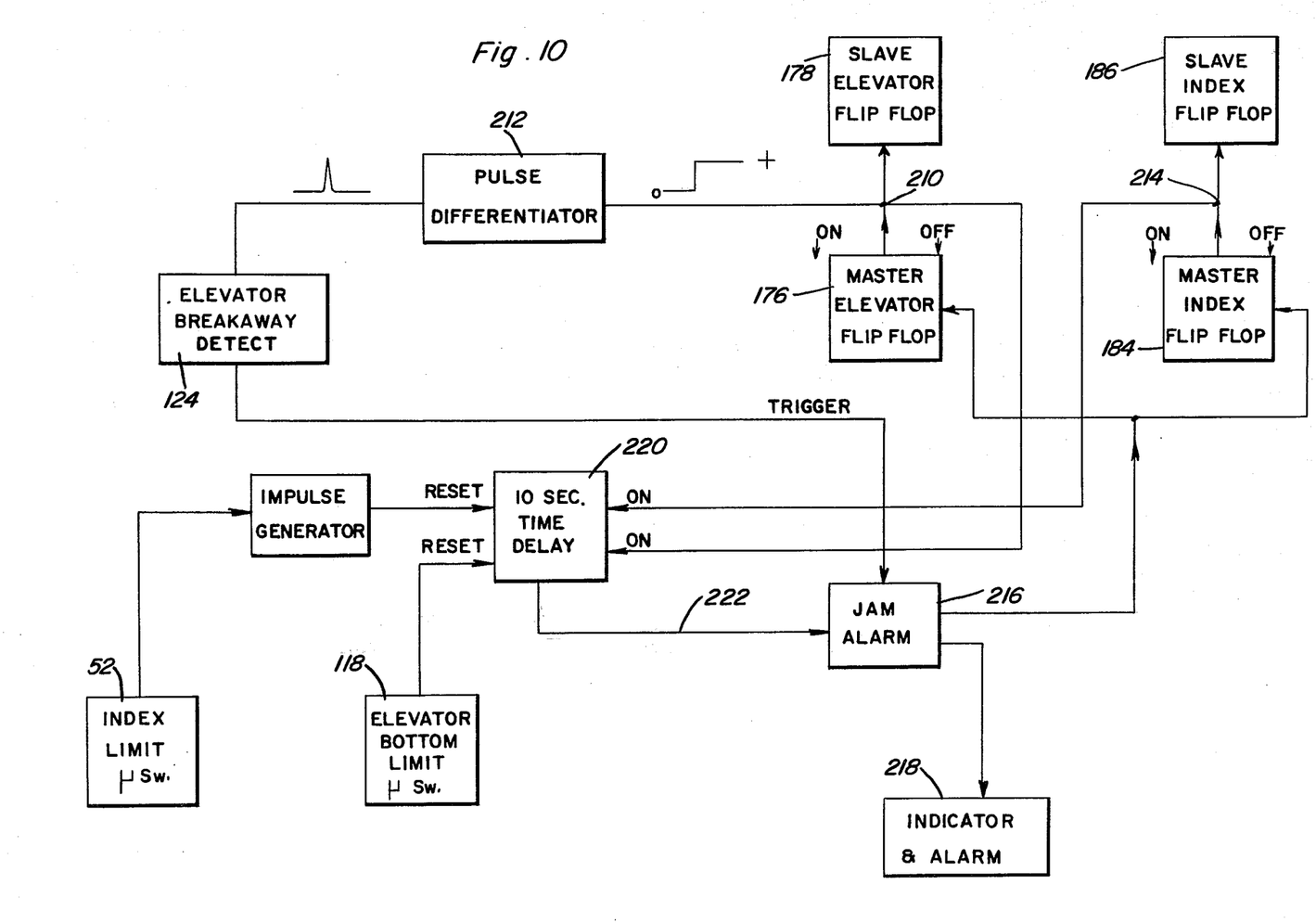
FIG. 10 a block diagram illustrating the jam alarm feature of the inventive sample changer.

Finally, reference is directed to FIG. 10, which is a block diagram of the jam alarm circuit employed in the inventive automatic sample changer. When the elevator motor is idle, a positive voltage transition appears at junction 210. This positive transition is shaped into a pulse by the pulse differentiator 212, and passes through the normally closed microswitch designated at 124 in FIG. 10 as the elevator breakaway detect, if indeed closed. It will be recalled that the camming surfaces 106 and 108 effect actuation of switch 124, and hence the opening of the normally closed circuit. In normal operation, the elevator motor will turn off when the switch 124 is actuated, or open. However, if the breakaway mechanism indicates a jam, then switch 124 will close the circuit and pulse the jam alarm 216.

As noted above, a high voltage transition at junction 210 turns the elevator motor off. A zero volt transition turns the elevator motor on. Similar voltage transitions at junction 214 control the operation of the index motor. The indexing circuitry operates the jam alarm 216 only through a timing circuit, unlike the elevator circuitry.

The jam alarm 216 serves to issue an audible signal if triggered by breakaway switch 124, for example. At the same time, an indicator and alarm button 218 on the front panel will become illuminated. And though not illustrated, depression of the indicator and alarm button 218 resets the entire circuit.

A 10-second R-C time delay circuit 220 controls one phase of the operation of jam alarm 216. This delay circuit 220 is reset each time the index limit switch 52 is actuated, and is held at reset when the elevator bottom limit switch 118 is actuated. (The counting operation could require more than 10 seconds.) The delay circuit 220 is also held in the reset condition when both the elevator and index motors are idle, that is, when high voltage transitions simultaneously appear at junctions 210 and 214. Should the delay circuit 220 not be reset within the designated 10-second period, the jam alarm is sounded by way of a command on line 222.

Above, a specific embodiment of the present invention has been described. It should be appreciated, however, that this embodiment was described for purposes of illustration only, without any intention of limiting the scope of the present invention. Rather, it is the intention that the present invention be limited not by the above but only as is defined in the appended claims.

We claim:

1. An automatic sample changer for transporting a plurality of test samples along a track, and for sequentially studying the characteristics of the samples being tested in a testing region remote from the track, the sample changer comprising: conveyor means for sequentially associating the samples with the testing region; a continuous elongated track which directly encounters said conveyor means at one location along its length; a plurality of independent transport means sequentially positioned along substantially the entire length of said track, each of which is adapted to associate with a sample; and indexing means for associating with said plurality of transport means to advance the samples associated therewith along said continuous track, said indexing means comprising a rotatable hub having a plurality of extensions thereon each of which contacts and moves a plurality of said transport means at spaced locations along said track.

2. The sample changer recited in claim 1, wherein said hub comprises four extensions projecting therefrom, and wherein each of said extensions intersects a discreet region of said track to prevent movement of said transport means at spaced locations along said track.

3. The sample changer recited in claim 2, wherein each of said projections limits movement of a portion of said transport means when one of said transport means is in association with said conveyor means.

4. The sample changer recited in claim 3, wherein a transport means is isolated from the remaining transport means when in association with said conveyor means; said isolation being between adjacent ones of said extensions intersecting said track.

5. The sample changer recited in claim 1, wherein said track is in the form of a continuous slot through a plate, said transport means being carried in said slot.

6. The sample changer recited in claim 5, wherein each of said transport means is in the form of a puck having a groove into the perimeter thereof; and wherein said pucks slide in said continuous slot by association with their respective grooves.

7. The sample changer recited in claim 6, wherein said pucks are cylindrical.

8. The sample changer recited in claim 6, wherein each puck has a bore therethrough for supporting the samples being tested.

9. The sample changer recited in claim 1, wherein said hub comprises a plurality of extensions projecting therefrom, and wherein all of said extensions intersect said track to prevent movement of all of said tansport means when one of said transport means is in association with said conveyor means.

10. The sample changer recited in claim 9, wherein adjacent ones of said extensions isolate said one transport means when in association with said conveyor means.

11. The sample changer recited in claim 9, wherein each of said extensions serves to advance a portion of said transport means along said track; and wherein each of said extensions indexes its respective portion of said transport means by one tansport means each time said extensions associate with subsequent discrete portions of said track.

12. The sample changer recited in claim 1, wherein said track is symmetrical about at least one line of symmetry; and wherein said rotatable hub is mounted for rotation on a line of symmetry of said track.

13. The sample changer recited in claim 1, wherein said conveyor means comprises an elevator mechanism for sequentially moving said transport means from a first position associating with said track into a second position associating with said testing region; and wherein said elevator mechanism includes a cage having first and second resilient arms for grasping said transport means when in association therewith.

14. The sample changer recited in claim 13, wherein said first and second arms are contoured to follow the perimeter of said transport means.

15. The sample changer recited in claim 14, wherein said transport means are cylindrical; and wherein the cooperating surfaces of said first and second arms are concave.

16. The sample changer recited in claim 1, and further comprising alignment means associating with said indexing means to ensure that one of said transport means is in association with said conveyor means before said conveyor means becomes operative.

17. The sample changer recited in claim 16, wherein said alignment means comprises at least one camming surface on said rotatable hub, and an electrical contact associating with said camming surface; and wherein said electrical contact associates with said conveyor means for controlling the operation thereof.

18. The sample changer recited in claim 1, wherein said conveyor means moves between a first position in association with said continuous track, and a second position in association with said testing region; and further comprising first sensing means associated with said conveyor means for sensing the presence of said conveyor means in said first and said second positions; and second sensing means associating with said indexing means for sensing the position of said indexing means when one of said transport means is in association with said conveyor means.

19. The sample changer recited in claim 18, and further comprising means for sensing the simultaneous actuation of said first and second sensing means.

20. The sample changer recited in claim 19, and further comprising jam alarm means for indicating when said conveyor means is jammed between said track and said testing region; and timing means for actuating said jam alarm means upon the elapse of a predetermined interval of time without the simultaneous actuation of said first and second sensing means.

21. The sample changer recited in claim 20, wherein said first sensing means resets said timing means each time said first sensing means is actuated.

22. The sample changer recited in claim 1, and further comprising printer means for visually printing the characteristics of the samples being tested, upon the completion of a test cycle.

23. The sample changer recited in claim 22, wherein said printer means further prints the respective conveyor positions of the samples being tested.

24. The sample changer recited in claim 1, and further comprising threshold means for programming minimum or maximum criteria allowable for the samples being tested; and indicator means for indicating when such criteria are unsatisfied.

25. An automatic sample changer for transporting a plurality of test samples along a planar track and for sequentially studying the characteristics of the samples being tested in a testing region remote from the plane of said track, the sample changer comprising: an elevator means for sequentially lowering samples into said testing region, wherein said elevator means comprises a control arm for moving the sample to be tested between an uppermost position associated with said track and a lowermost position associated with said testing region; motor means for moving said control arm between its uppermost and lowermost positions; and a breakaway connection between said motor means and said control arm which enables the motor means to operate without moving the control arm should a jam occur in the elevator means.

26. The sample changer recited in claim 25, and further comprising: means for detecting the actuation of said breakaway connection; and means for issuing a signal indicative of such actuation.

27. The sample changer recited in claim 26, and further comprising: first and second limit switch means for indicating, respectively, the orientation of said motor means and the position of said elevator means when in the uppermost and lowermost positions; and indicator means for indicating a jam in said elevator means when said first and second limit switch means fail to concurrently indicate the uppermost or lowermost positions of said control arm.

28. The sample changer recited in claim 27, and further comprising: a continuous elongated track along which the test samples are transported; and means for detecting and indicating jams in said track.

29. The sample changer recited in claim 28, and further comprising: time delay means for delaying the indication of jams in said track for a predetermined interval of time.

30. The sample changer recited in claim 25, wherein said breakaway connection comprises a pawl associated with said motor means, and a slidable connection between said pawl and said control arm.

31. The sample changer recited in claim 30, wherein said slidable connection comprises at least one detent and a plunger biased in the direction of said at least one detent.

32. The sample changer recited in claim 31, wherein said slidable connection comprises three spaced detents on said pawl, and said plunger on said control arm; and wherein during normal operation of said elevator means, said plunger resides in the intermediate of said three detents.

33. The sample changer recited in claim 32, wherein said three detents are in a straight line; wherein a jam in said elevator means results in said plunger breaking away from the intermediate of said three detents; and wherein the outer two of said three detents associate with said plunger to reset said breakaway connection after the jam has been corrected.

34. The sample changer recited in claim 25, and further comprising first and second sensing means associated with said control arm for sensing the presence of said elevator means in its uppermost and its lowermost positions.

35. For use in an automatic sample changer for transporting a plurality of test samples from a first location to a second location, a continuous elongated track which directly encounters said first location at one position along its length; a plurality of independent transport means sequentially positioned along substantially the entire length of said track, each of which is adapted to associate with a sample; and indexing means for associating with said plurality of transport means to advance the samples associated therewith along said continuous track, said indexing means comprising a rotatable hub having a plurality of extensions thereon, each of which extensions contacts and moves a plurality of said transport means at spaced locations along said track.

* * * * *